UNITED STATES PATENT OFFICE.

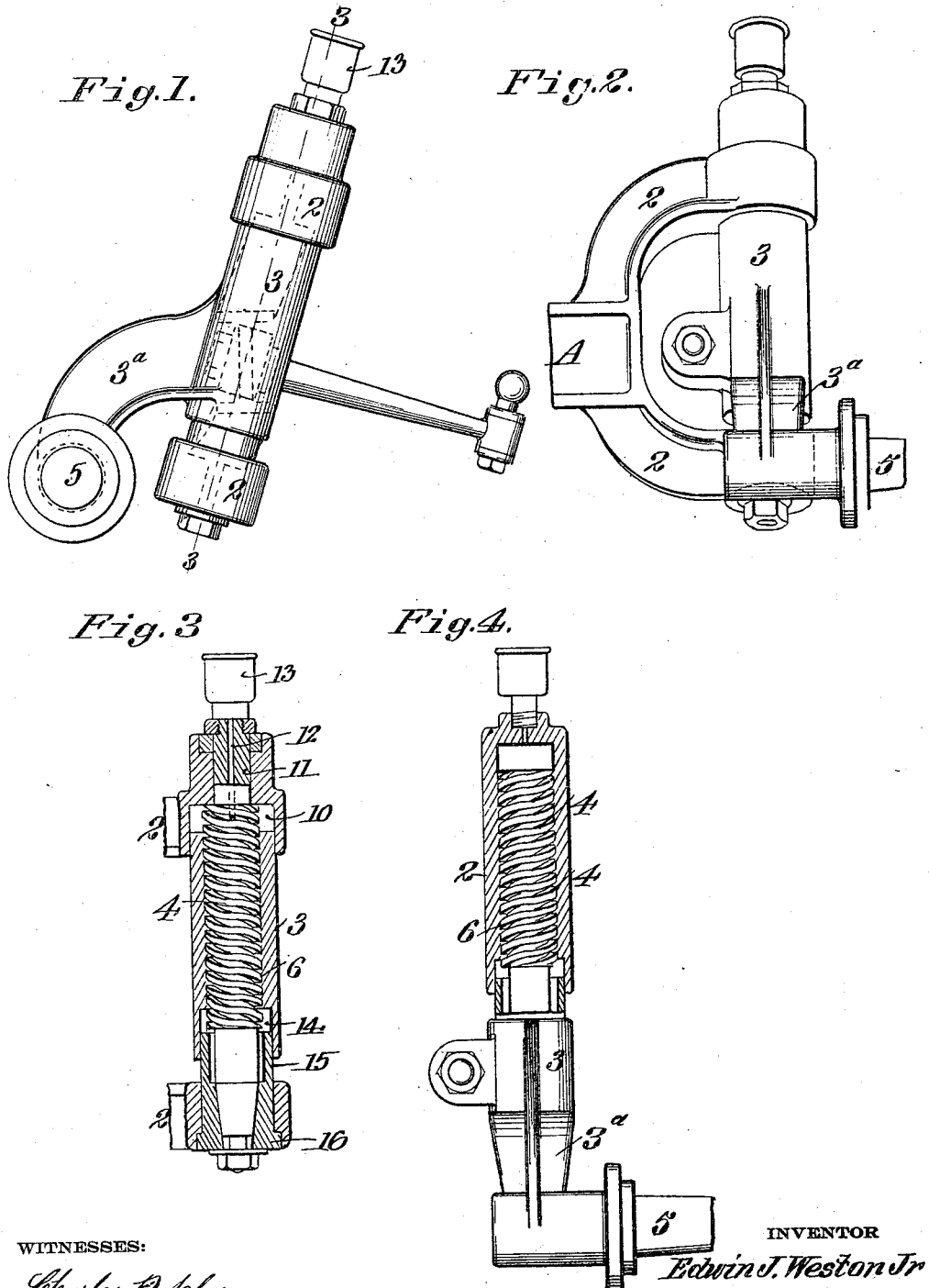

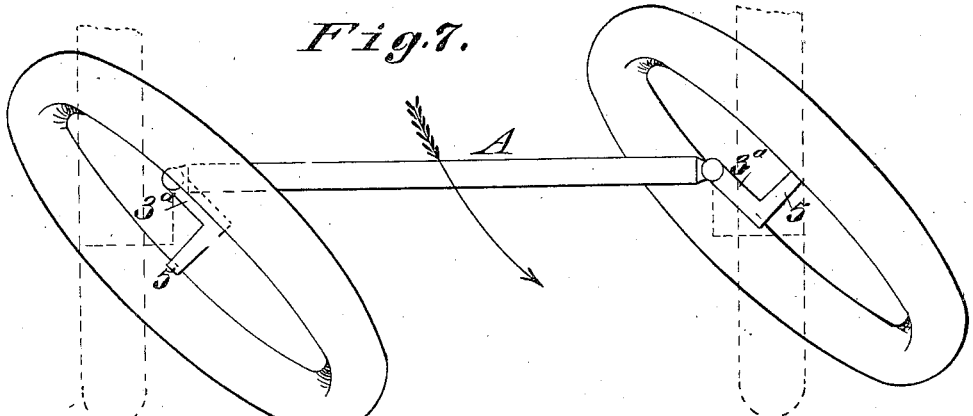
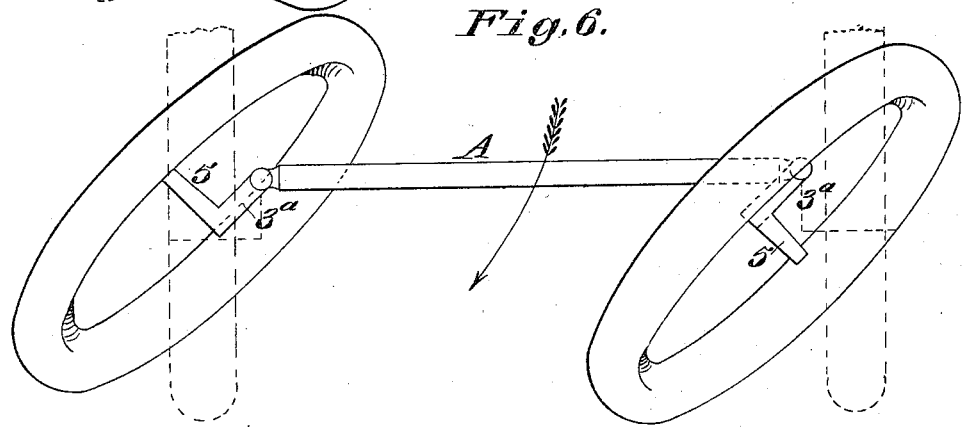
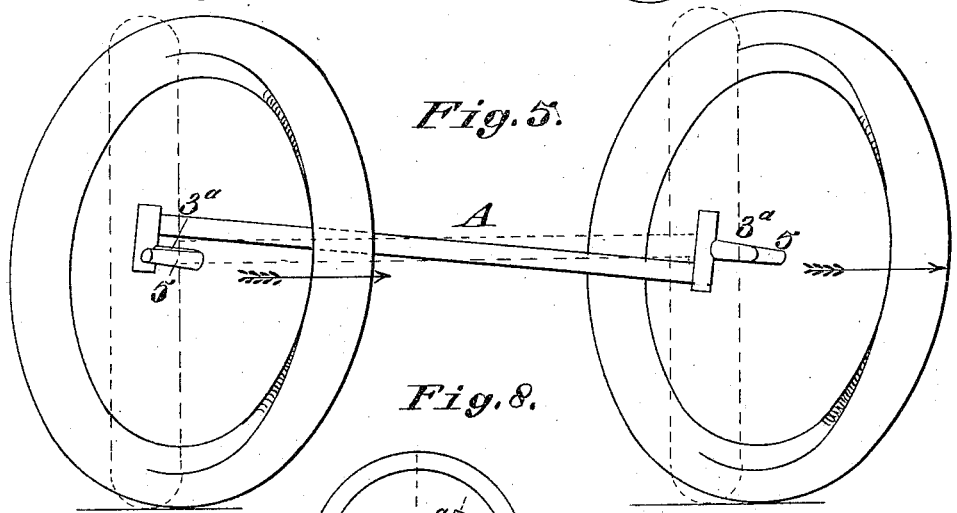
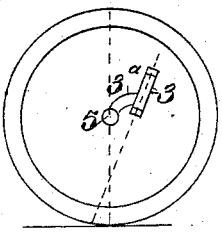

EDWIN J. WESTON, JR., OF BERKELEY, CALIFORNIA, ASSIGNOR OF ONE-TENTH TO MORRIS ZIRKER, OF SAN FRANCISCO, CALIFORNIA, AND ONE-TENTH TO J. R. SHELTON, OF WOODLAND, CALIFORNIA.

WHEEL-MOUNTING.

1,256,963.   Specification of Letters Patent.   Patented Feb. 19, 1918.

Application filed June 10, 1916. Serial No. 102,882.

*To all whom it may concern:*

Be it known that I, EDWIN J. WESTON, Jr., a citizen of the United States, residing at Berkeley, in the county of Alameda and State of California, have invented new and useful Improvements in Wheel-Mountings, of which the following is a specification.

This invention relates to a wheel mounting for vehicles, and is especially applicable to automobiles and vehicles in which the wheels are journaled upon spindles carried by what are termed "steering knuckles" that are turnably mounted in forks formed on the front axle ends and which in turning with the knuckles maintain a condition of approximate parallelism.

One of the objects of the present invention is to provide means for inclining the wheels when making a turn in the direction of the turn. Another object of the invention is to provide means for inclining the axle and the vehicle body supported thereby, when making a turn, to establish a condition similar to that produced by a roadbed which is inclined transversely to the direction of travel. Further objects will hereinafter appear.

The invention consists of the parts and the construction and combination of parts as hereinafter more fully described and claimed, having reference to the accompanying drawings, in which—

Figure 1 is a side elevation of one of the steering knuckles.

Fig. 2 is a front view of same.

Fig. 3 is a central, vertical section on line 3—3 of Fig. 1.

Fig. 4 is a section, similar to Fig. 3, showing a modification of the construction.

Fig. 5 is a diagrammatic front view of the front axle, showing the inclined position it assumes when making a turn.

Fig. 6 is a diagrammatic plan view of the front axle and wheels, showing the inclined position of the wheels, when making a right-hand turn.

Fig. 7 is a similar view, showing the inclined position of the wheels when making a left-hand turn.

Fig. 8 is a diagrammatic view showing a relative angle of the knuckle arm to the ground line.

In turning corners with heavy, rapidly moving vehicles, particularly automobiles, there is a tendency, caused by centrifugal action, to produce an outward thrust upon the front wheels which not only tends to collapse the spoke structure and throw the tire but also places a severe strain upon the wheel spindles and steering knuckles by which they are carried. It, furthermore, has a tendency to overturn or up-end the vehicle, or, in other words, establishes conditions or unnecessary strains which are dangerous particularly when traveling at high speeds. The object of the present invention is to provide means for counteracting the outward thrust or lateral strain upon the front wheels and, furthermore, to overcome the tendency of up-ending or overturning the vehicle when turning in either direction.

Referring to the drawings, A represents a fixed axle such as is commonly used on an automobile and 2 the forks, one being formed at each end. The forks are in this instance set on an angle, as shown, and are designed to receive a knuckle 3 which is secured in any suitable manner, or, as here shown, by a bolt 4. Formed on one side of the knuckle is a forwardly extending arm $3^a$ which carries the wheel spindle 5. The wheel spindle 5 is secured to the extending arm $3^a$, on the knuckle 3, forwardly of the spiral bolt and in a horizontal line with the lower fork, as in Fig. 1, or below said fork, as in Fig. 8, so that a vertical line through the wheel would intersect the roadbed back of the intersection of an axial line through the bolt or shaft 4, as in Fig. 8. The arm $3^a$, while extending at an acute angle from the shaft also extends horizontally therefrom with the forward end downturned so that the wheel spindle lies in a plane below the arm to receive the load in a more direct manner.

The wheels when pointing straight ahead assume an approximately vertical position, but turning movement of the knuckles in one direction or the other will cause the wheels to incline at the top in the direction of the turn. This is due to the fact that the centers of the wheels are positioned forwardly of the axle.

By referring to Fig. 6, which is a diagrammatic view of the front axle and wheels, it will be seen that the wheels are turned to make a right-hand turn. It will also be seen that the wheels incline to the right at the top and are, therefore, in a position to better counteract the outward thrust or lateral movement transmitted, due to centrifugal action, when making the turn.

By referring to Fig. 7, which is a diagrammatic view showing the position of the wheels when making a left-hand turn, it will be seen that the wheels assume a left-hand incline at the top. They are, therefore, positioned, practically speaking, in alinement with the outward or lateral thrust produced, and the tendency of collapsing the spoke structure, throwing the tires, or bending the spindles, is practically overcome, if not entirely eliminated.

It is well-known that railway track beds and high speed race tracks are always inclined laterally with relation to the direction of travel particularly at points where turns are made. This incline of the roadbed reacts against the centrifugal action of the moving body and prevents overturning of same when rounding a curve. A similar condition is established by providing means for inclining the front axle of the vehicle body supported thereby. This is accomplished in the present instance by forming a thread 6 upon the bolts and by forming an internal thread on the knuckles supported thereby. The knuckles will, therefore, either become raised or lowered with relation to the bolts, when making a turn, as the action is similar to a nut upon a thread. The threaded bolts are necessarily reversed with relation to each other; the king bolt on the right side having a left-hand thread and the king bolt on the left side a right-hand thread.

It can be seen that if the knuckles and wheels are turned to the left the right-hand knuckle will be raised and the left-hand knuckle lowered, thus causing the axle and the body supported thereby to be inclined or to establish a condition similar to a roadbed which is inclined laterally with relation to the line of travel.

In Fig. 3 it will be seen that the bolt is rigidly secured in the fork of the axle while a reverse condition is produced by the structure shown in Fig. 4, that is, the bolt is in this instance permitted to turn with the knuckle and wheel while the axle end forms the nut which permits the axle ends to be raised or lowered, as previously described.

The upper fork part 2, as seen in Fig. 3, is formed in its under face with a socket 10 into which the upper end of screw shaft 4 extends, the latter having a trunnion extension 11 that is journaled in said fork part and extended axially therethrough. This trunnion 11 is provided with a duct 12 for conveying a lubricant from a superposed cup 13 to the threads of the screw shaft. The spindle sleeve 3 is engaged with the threads of the screw shaft and has its upper end slidable within the socket 10. The lower end of the sleeve 3 is counterbored to provide a socket 14 which receives an upward extension 15 on bushing 16, the latter being provided in the lower fork part 2 for mounting the lower end of the screw shaft.

It will thus be noted that the bushing 16, sleeve 3 and upper fork part 2 are assembled in nested relation, no extra parts are required, and the relatively slidable elements are joined by downwardly extending overlapping portions to exclude the sifting in of dirt and foreign matter.

A steering knuckle constructed as here shown positively overcomes the objections previously described, inasmuch as it causes the wheels to assume an inclined position in the direction of the turn, and, furthermore, permits the axle and body supported thereby to assume an inclined position.

Having thus described my invention, what I claim and desire to secure by Letters Patent is—

1. In a wheel mounting for automobiles, an axle having terminal fork bearings, inclined backwardly from the vertical, a spindle support journaled in each bearing, an arm formed integral with and extending forwardly from each support at a downward and acute angle thereto to impose the load more directly on the support, the forward ends of the arms being curved downwardly and terminating forwardly of and in proximity to the lower fork part of the respective fork bearings, and a spindle projecting laterally from the downturned terminal of each.

2. In a wheel mounting for vehicles, an axle having inclined terminal bearings, a spindle support journaled in each bearing being also disposed at an inclination, an arm extending horizontally and at a downward acute angle from the spindle support to impose the load more directly on the latter, said arm having its outer end downturned in convergent relation to said spindle support, and a laterally extending wheel spindle on the downturned end of each arm.

In testimony whereof I have hereunto set my hand in the presence of two subscribing witnesses.

EDWIN J. WESTON, Jr.

Witnesses:
FRANCES V. COLE,
W. W. HEALEY.